(12) United States Patent
Blum

(10) Patent No.: US 11,459,758 B1
(45) Date of Patent: Oct. 4, 2022

(54) BUILDING PROTECTIVE COMPOSITE

(71) Applicant: Ronald Blum, Atlanta, GA (US)

(72) Inventor: Ronald Blum, Atlanta, GA (US)

(73) Assignee: Blum Family, LLC, Atlanta, GA (US)

(*) Notice: Subject to any disclaimer, the term of this patent is extended or adjusted under 35 U.S.C. 154(b) by 0 days.

(21) Appl. No.: 17/727,328

(22) Filed: Apr. 22, 2022

Related U.S. Application Data

(60) Provisional application No. 63/179,201, filed on Apr. 24, 2021.

(51) Int. Cl.
| | | |
|---|---|---|
| *E04D 1/28* | (2006.01) | |
| *B32B 27/36* | (2006.01) | |
| *B32B 27/06* | (2006.01) | |
| *B32B 11/04* | (2006.01) | |

(52) U.S. Cl.
CPC .............. *E04D 1/28* (2013.01); *B32B 11/048* (2013.01); *B32B 27/065* (2013.01); *B32B 27/36* (2013.01); *B32B 2250/03* (2013.01); *B32B 2250/04* (2013.01); *B32B 2250/05* (2013.01); *B32B 2266/025* (2013.01); *B32B 2307/304* (2013.01); *B32B 2307/7265* (2013.01); *B32B 2419/00* (2013.01)

(58) Field of Classification Search
CPC .... E04D 1/28; E04D 5/00; E04D 5/02; E04D 5/04; E04D 5/06; E04D 5/10
See application file for complete search history.

(56) References Cited

U.S. PATENT DOCUMENTS

| | | | |
|---|---|---|---|
| 4,450,663 A | 5/1984 | Watkins | |
| 2003/0124932 A1* | 7/2003 | Droux | D21H 13/24 |
| | | | 442/164 |
| 2003/0186045 A1 | 10/2003 | Wardle et al. | |
| 2005/0074574 A1 | 4/2005 | Fay et al. | |
| 2009/0064618 A1* | 3/2009 | Ben-Daat | B32B 5/24 |
| | | | 52/408 |
| 2012/0276369 A1* | 11/2012 | Jing | C09D 7/67 |
| | | | 977/892 |
| 2013/0205708 A1 | 8/2013 | Shaw | |
| 2015/0354211 A1 | 12/2015 | Nandi et al. | |
| 2017/0044769 A1 | 2/2017 | Fritz | |

(Continued)

FOREIGN PATENT DOCUMENTS

| | | | | |
|---|---|---|---|---|
| CN | 109693435 A | * | 4/2019 | |
| GB | 2105256 A | * | 3/1983 | ............. B32B 11/04 |
| WO | WO 2020096919 | | 5/2020 | |

OTHER PUBLICATIONS

Machine Translation of CN 109693435 (Year: 2019).*

(Continued)

*Primary Examiner* — Zachary M Davis
(74) *Attorney, Agent, or Firm* — Woods Rogers Vandeventer Black; Timothy Bechen; Nathan Evans

(57) ABSTRACT

A protective composite provides for insulating a building. The protective composite includes integrated layers. One layer is a thermal reflective layer having a reflective surface. Another layer is an air retaining material layer including a material retaining air therein. Another layer is a water repelling material layer. Thereby the protective composite includes two or more of the layers connectable to a building, building material, or other item, e.g. solar panel.

24 Claims, 12 Drawing Sheets

(56) References Cited

U.S. PATENT DOCUMENTS

2019/0345713 A1 11/2019 Lolley
2021/0025158 A1 1/2021 Alhems et al.

OTHER PUBLICATIONS

Pozzobon et al., Household aluminum foil matte and bright side reflectivity measurements: Application to a photobioreactor light concentrator design, 2020, Elsevier, Biotechnology Reports 25, pp. 1-7 (Year: 2020).*
Alfipa website, https://alfipa.com/products/aluminum-foil-metalized-pet-film/, Available May 18, 2018, Accessed Jun. 28, 2022 (Year: 2018).*
"Comparing Rigid Foam Plastic Insulations" Owens Corning World Headquarters, May 2008, pp. 1-4.
"Understanding Your Roof" Joyland Roofing, (https://joylandroofing.com/blog/parts-of-a-roof-the-roof-deck/), Oct. 27, 2020, pp. 1-5.
"Written Opinion of the International Searching Authority" PCT/US22/25982, PCT International Searching Authority, Jul. 25, 2022, pp. 5-10.

\* cited by examiner

BUILDING PROTECTIVE COMPOSITE

CROSS-REFERENCE TO RELATED APPLICATIONS

The present application relies on the disclosures of and claims priority to and the benefit of the filing date of U.S. Provisional Application No. 63/179,201, filed Apr. 24, 2021, the disclosure of which is hereby incorporated by reference in its entirety.

BACKGROUND OF THE INVENTION

Field of the Invention

The present invention relates to protective composite material and more specifically to a protective composite for insulating a building.

Description of Related Art

Since the Industrial Revolution, the global annual temperature has increased in total by a little more than 1 degree Celsius, or about 2 degrees Fahrenheit. Between 1880—the year that accurate recordkeeping began—and 1980, it rose on average by 0.07 degrees Celsius (0.13 degrees Fahrenheit) every 10 years. Since 1981, however, the rate of increase has more than doubled: For the last 40 years, we've seen the global annual temperature rise by 0.18 degrees Celsius, or 0.32 degrees Fahrenheit, per decade.

Thus, there is a need for a better insulation material for insulating building structures where humans (by way of example only) live, sleep, eat, work, be entertained. This need applies for insulating such a building structure from outdoor heat or from outdoor cold temperatures in order to maintain a comfortable indoor environment while simultaneously reducing energy consumption. In addition, the use of solar panels on the roof of a house can add to heat transferred to the building on which the solar panel(s) is being supported. There is a pressing need for an insulation material that can reduce such heat being transferred to the building.

Existing insulation techniques seek to trap heat within a building. This solution is focused on reducing heating costs in the colder months, but causes increased cooling costs in warmer months.

Current installation techniques rely on installing individual protective layers on a building one individual layer at a time. This current technique is problematic for a variety of reasons, including added time and labor costs for multiple installations. The individual installations further introduces gapping or other potential spacing issues between the separately-installed layers. As with any gapping concerns, there are issues of potential moisture, mold, or other environmental concerns arising from the separately-installed layers. Another concern is that with gapping or installation errors, this can negate the beneficial effects of the individual layers, for example of a gap arises in a water-tight barrier, this would effectively trap the water in between the separate layers.

Additionally, the current techniques for installing individual layers does not seek or generate thermal management. Rather, the current layer-based approach focuses on protecting the building or other unit from the weather elements, e.g. keeping moisture out of the substructure and/or supporting water flow for drainage areas. Current installation techniques rely on interior insulation within the building itself for heat management, for example installation installed in the attic of a house to trap interior heat during colder months.

Therefore, there exists a need for a solution providing protective thermal reflective composite material(s) for buildings. Moreover, there exists a need for a solution of a composite material already combined and effectively adhered in layers prior to installation.

SUMMARY OF THE INVENTION

According to embodiments, the present invention provides a protective composite for insulating a building. The protective composite acts as a thermal management composite material providing for resilient construction with the goal of creating and supporting a weather resistant building. As described in greater detail, the protective composite includes one or more layers that facilitate thermal management for a building including one or more features of deflecting thermal energy away from the building and/or reflecting thermal energy back towards a building.

The protective composite includes a thermal reflective layer having a reflective surface, an air retaining material layer including a material retaining air therein, and a water repelling material layer.

In one embodiment of the protective composite, at least two of the layers, e.g. the thermal reflective layer, the air retaining material layer, and the water repelling layer, are attached to one another.

In one embodiment of the protective composite, the air retaining material layer and the water repelling material layer are thermally bonded to one another.

In one embodiment of the protective composite, at least two of the layers, e.g. the thermal reflective layer, the air retaining material layer, and the water repelling layer are laminated to one another.

In one embodiment of the protective composite, the protective composite is a stack of the thermal reflective layer, the air retaining material layer, and the water repelling layer.

In one embodiment of the protective composite, the water repelling material layer comprises tar paper. In one embodiment of the protective composite, the water repelling material layer comprises asphalt.

In one embodiment of the protective composite, the air retaining material layer comprises open cell foam. In one embodiment of the protective composite, the air retaining material layer comprised closed cell foam. In one embodiment of the protective composite, the air retaining material layer is composed of an absorptive material.

In one embodiment of the protective composite, the thermal reflective layer is comprised of a polyethylene terephthalate film.

In one embodiment of the protective composite, the protective composite is attached to a portion of a roof of the building.

In one embodiment of the protective composite, the protective composite is covered by a roof shingle. In one embodiment of the protective composite, the protective composite is covered by siding. In one embodiment of the protective composite, the protective composite is covered by a solar panel.

In one embodiment of the protective composite, the protective composite is covered by a material that is exposed to the outdoor environment.

In one embodiment of the protective composite, the air retaining material comprises at least one of: ethylene-vinyl acetate and expanded polyethylene.

In one embodiment of the protective composite, the reflective surface of the thermal reflective layer faces away from the building. In one embodiment of the protective composite, the reflective surface of the thermal reflective layer faces towards the building.

In one embodiment of the protective composite, the reflective surface is a first reflective surface, the protective composite further includes a second reflective surface. In this embodiment, the first reflective surface faces in a direction opposite of the second reflective surface.

In one embodiment of the protective composite, the reflective surface reflects at least one of: infra-red radiation, thermal radiation, electro-magnetic radiation.

In one embodiment of the protective composite, the thermal reflective layer is usable as a backing for one or more of: a roof shingle, a solar panel, and a building siding.

In one embodiment of the protective composite, the reflective surface of the thermal reflective layer reflects 50% or more of a thermal radiation impacting the thermal reflect layer. In one embodiment of the protective composite, the reflective surface of the thermal reflective layer is silver. In one embodiment of the protective composite, the reflective surface of the thermal reflective layer is a metalized layer. In one embodiment of the protective composite, the reflective surface of the thermal reflective layer is a polyethylene terephthalate film.

In one embodiment of the protective composite, the protective composite is rollable. In one embodiment of the protective composite, the protective composite is foldable. In one embodiment of the protective composite, the protective composite is formed in a sheet of layers.

In one embodiment of the protective composite, the water repelling material layer is in a layer of the protective composite closest to an outdoor environment. In one embodiment of the protective composite, the water repelling material is in a layer of the protective composite closest to the building.

In one embodiment, the protective composite may include an anti-microbial coating. In one embodiment, the anti-microbial coating may cover the protective composite. In another embodiment, the anti-microbial coating may cover one or more of the layers, either covering the layers individually or covering one or more combined layers.

In one embodiment, the protective composite may include a repellant coating. The repellant coating, for example, may be an insecticide coating or in another embodiment may be a pest repellant coating. In one embodiment, the repellant coating may cover the protective composite. In another embodiment, the repellant coating may cover one or more of the layers, either covering the layers individually or covering one or more combined layers.

As the protective composite acts a thermal management composite material, the material can come in any number of forms, including but not expressly limited to a roll, a folded material, and a sheet of material. The thermal management protective composite can be applied prior to applying shingles to a roof or the thermal management protective composite can be applied prior to applying exterior siding to the building.

These embodiments as well as additional embodiments and their features will be apparent in the foregoing Detailed Description.

BRIEF DESCRIPTION OF THE DRAWINGS

The accompanying drawings illustrate certain aspects of embodiments of the present invention, and should not be used to limit the invention. Together with the written description the drawings serve to explain certain principles of the invention.

DETAILED DESCRIPTION OF VARIOUS EMBODIMENTS OF THE INVENTION

Figure 1:
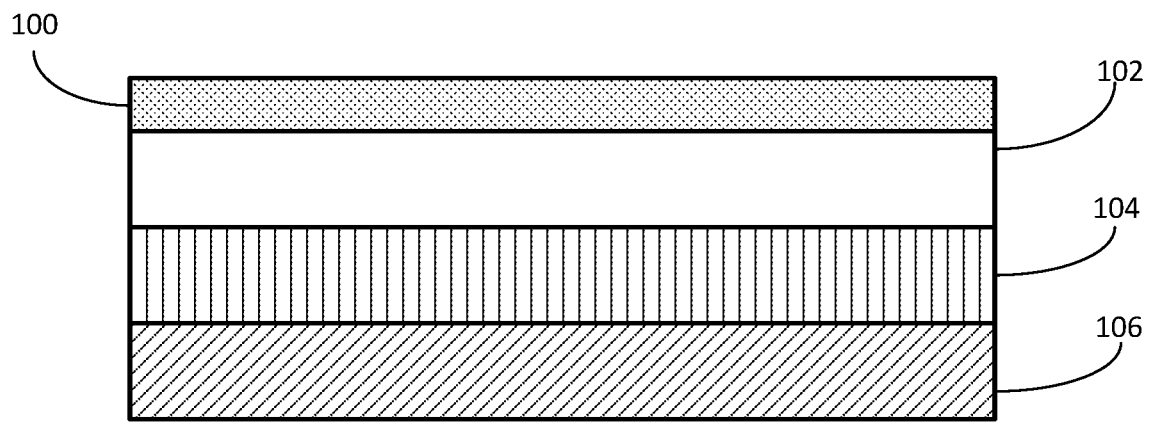
FIG. 1 is a cross-sectional side-view drawing of one embodiment of a protective composite attached to a roof shingle.

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

As used herein, the term "about" is understood as within a range of normal tolerance in the art, for example within 2 standard deviations of the mean. The term "about" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

As used herein, the term "metallized" (as in "metallized" Mylar®) refers to a material such as a polymer film which has been coated with a thin layer of metal, such as aluminum, chromium, or nickel, typically through a physical vapor deposition (PVD) process. The thin layer of metal can be coated on one surface of the material or both surfaces.

As used herein, the term "laminated" (or variations including "laminate", "lamination", and the like) refers to the process or result of creating a composite material by joining two layers together, typically under heat and pressure and through use of an adhesive.

As used herein, the term "thermal bonding" refers to the process or result of creating a composite material by joining two or more layers by the melting together fibers or other integral elements, using pressured steam, hot air, or any other suitable heat and/or heat and pressure source.

As used herein, the term "tar paper" refers to any suitable type of standard-duty or heavy-duty paper impregnated or otherwise covers or immersed with tar or other suitable similar substance, providing waterproofing results.

As used herein, "Mylar®" may be used interchangeably with "biaxially-oriented polyethylene terephthalate (PET) film", "polyethylene terephthalate (PET) film", "polyester film", and similar terminology.

As used herein, the term "building" means any type of building structure. Exemplary types of structures include, but are not limited to, a house, apartment building, condominium building, office building, industrial building, house of worship, medical building, business building, garage, athletic club, facility or arena.

As used herein, the term "foam" can be any suitable foam as recognized by one skilled in the art for use as part of the thermally protective composite described herein. A foam is a material structure formed by the trapping of pockets of has in a liquid or solid. The foam can be any suitable degree of hardness from soft pliable to a stiff rigidity. The foam can further be a material having absorptive properties, including properties for absorbing incoming media, for example but not limited to absorbing moisture, heat, sound, etc. The absorptive properties can range from minimal to maximum properties consistent with material properties for the air retaining material layer as recognized by one skilled in the art.

As used herein, term "composite" can be one or more layers of materials, a composite of laminated layers, and/or a composite of different intermixed materials. The thermally protective composite disclosed herein can be an outermost layer or exterior layer of a building or structure placed under or on top of the outer most layer.

The protective composite disclosed herein can be utilized in any number of installation techniques, including but not limited to: decking for a roof; starter strips for shingles, underlayment, shingles, ridge caps, and siding. In another embodiment, the protective composite can be utilized with or installed concurrent with a solar panel.

As used herein, decking for a roof, as referred to as the roof deck or roof layer or sheathing, is the installation layer between trusses and joists and underlayment layer in a standard roof installation. The roof deck acts as a unifying structure by tying the trusses & joists together. There are a number of available roof deck options for installation, including but not expressly limited to: Architectural Roof Pavers, plywood or OSB sheets, wood tongue and groove, corrugated metal, sprayable ceramic encapsulated polystyrene, reinforced concrete, and double tee.

As used herein, starter strips and starter strip shingles, are a strip of shingles that line every edge of a typical roof. Starter strip shingles are installed after the roof decking and before the underlayment. Most starter strip shingles have a factory applied adhesive strip that helps speed installation time while helping to prevent shingles from blowing off. Not only are starter strips a more cost-effective alternative to using hand-cut shingles, but the adhesive ensures that your shingles are perfectly aligned, making it easy to install a roof with straight lines and requires no dangerous cutting of access tiles off the edge of the roof.

As used herein, underlayment is a layer in roofing or siding that prevents wind driven rain (or water from other sources) from infiltrating under the shingles and causing damage to the roof structure and/or the inside of the structure. The underlayment provides an extra layer of protection between the shingles and a roof deck, as well as reducing shingle blow-off by allowing the shingles to lay flatter and more uniformly.

As used herein, shingles are the final layer to the roof and arguably the most important part. Roof shingles are almost always highly visible and so are an important aspect of a building's aesthetics in patterns, textures and colors. Roof shingles, like other building materials on vernacular buildings, are typically of a material locally available. The type of shingle is considered before construction because the material affects the roof pitch and construction method: Some shingles can be installed on lath where others need solid sheathing (sheeting) on the roof deck.

As used herein, a ridge cap is a building material that is installed along the ridge line of a sloped roof. A traditional gabled roof on a home is made up of two sloped sides that meet in the middle. The point where these two sides meet forms the apex of the roof and is known as the ridge or ridge line. A ridge cap fits over the joint between these two edges to keep rain and snow out of the home. It also helps to finish off the look of the roof by creating a tightly sealed joint along the two sides. Some form of ridge cap is used on almost every kind of sloped roof. The most basic type of unit consists of asphalt shingles, which are cut to fit over the ridge. The shingles are installed in overlapping rows until they reach the ridge, then wrapped over to meet the other side of the roof. A second set of shingles is cut to fit over the top and to provide a cohesive finish to the roof. Some builders may use pre-fabricated roof caps when installing roofing systems. These units can be made from asphalt shingles, aluminum, copper, or even plastic. They are generally chosen to match the rest of the roof surface, though some may simply be covered by additional roofing material. Many uncovered ridge caps are painted, or they may be pre-finished at the factory in a variety of colors and designs to match popular roofing materials.

As used herein, siding is any suitable material used to surface the exterior of a building to protect against exposure to the elements, prevent heat loss, and visually unify the facade. The word siding implies wood units, or products imitative of wood, used on houses, however for the purposes of this disclosure the word siding can include any material that is placed on the side of a building structure. Siding can include, but is not expressly limited to, vinyl, polyvinyl, engineering hardwood, cement-based board siding, composite siding, metal siding, fiber cement siding, or other siding types as recognized by one skilled in the art.

As used herein, a solar panel can be suitable type of device or devices for engaging sunlight exposure and converting the sunlight exposure into energy. The solar panel can be a directly mounted panel, directly affixable to the building or structure. The solar panel can be an offset mounted panel raised or installed with an air gap between the panel and the building or structure. Moreover, the solar panel may include framing or other structure elements and a housing or encasement protecting the panel or panels for external forces.

Generally speaking, one embodiment of the invention disclosed herein is a thermally protective composite for insulating a building, wherein the thermally protective composite comprises a thermal reflective layer having a reflective surface, an air retaining material layer, and a water repelling material layer.

The protective composite can be comprised of two or more layers that are attached to one another. The protective composite can be comprised of two or more materials that are thermally bonded to one another. The protective composite can be two or more layers that are laminated to one another.

The attachment of the layers can be via any number of available techniques, including but not limited to heat lamination, for example using a thermal lamination machine and rolling the layers with an adhesive applied therebetween. The layers can be attached by stitching, sewing, or other mechanical means, for example installing stitching around an exterior portion of the protective composite. The layers can be attached using any suitable adhesive, including for example industrial adhesives gluing or other adhering the layers in contacting engagement, for example applying adhesives to various layers and rolling or pressing the layers in contacting engagement while the adhesive pressingly adheres the layers together.

The protective composite can be a stack of layers. The protective composite be, in one embodiment, a laminated stack.

The water repelling material layer can be any suitable layer of material including water repellant properties. For example, in one embodiment, the water repelling material layer can be tar paper. In another exemplary embodiment, the water repelling material layer of the composite can be comprised of asphalt. In another exemplary embodiment, the water repelling material can be a material made from high-density spunbound polyethylene fibers, for example one embodiment being the commercially-available material known as Tyvek®. The above examples of water repelling material layer material are exemplary in nature and not any exclusive or restrictive list of materials.

The air retaining material layer can be any suitable layer of material having air and/or gas retention therein. The air retaining material later includes a material retaining air therein. For example, in one embodiment, the air retaining material layer can include a foam as the material retaining air, the foam being an open cell foam. For example, in one embodiment, the air retaining material layer can include a foam as the material retaining air, the foam being an open cell foam. The foam can be made of one of, by way of example and not expressly limiting, EVA (ethylene-vinyl acetate), EPE(expanded polyethylene).

The thermal reflective layer can be any suitable layer having reflective surface including therewith. In one exemplary embodiment, the thermal reflect layer of the composite can be a polyethylene terephthalate film, such as Mylar®. The thermal reflective layer may be any other suitable layer including the reflective surface as noted herein and as recognized by one skilled in the art and is not expressly limited to Mylar®.

The protective composite can be attached to the roof of a building. The protective composite is installed as a unit with the various layers being simultaneously installed together by virtue of the protective composite layer engagements. Thereby, the protective composite cures prior installation problems by being a pre-existing unit, such as for example in a sheet, rolls, or any other suitable form facilitating installation.

The protective composite can be covered by a roof shingle. The protective composite can be covered by a solar panel. The protective composite can be covered by material that is exposed to the outdoor environment.

In one embodiment, the protective composite can be installed on the building or other structure prior to covering element, such as the roof shingle or solar panel. In another embodiment, the protective composite can be installed or attached to the covering element prior to installation, for example being installed on a bottom portion of a solar panel prior to solar panel installation on the building.

The reflective surface of the composite can face away from the building. The reflective surface of the composite can face the building. The protective composite can be comprised of two or more reflective surfaces, wherein the two or more reflective surfaces are reflective in a direction opposite one another and wherein one reflective surface reflects heat away from a building and one reflective surface reflects heat back into a building.

The reflective surface of the composite can reflect IR radiation. The reflective surface of the composite can reflect thermal radiation. The reflective surface of the composite can reflect electro-magnetic radiation. The reflective surface of the composite can be of a silver color. The reflective layer of the composite can be a metalized layer.

The reflective layer can be a layer within the composite. The reflective layer can be a layer on one outside side of the composite. A reflective layer can be a layer on both outside sides of the composite.

The protective composite can be rollable. The protective composite can be foldable.

The protective composite can be formed in a sheet of layers.

The protective composite layer in the composite that is closest to the outdoor environment can be that of tar paper. The protective composite layer in the composite that is closest to the building can be that of tar paper. The protective composite layer in the composite that is closest to the outdoor environment can be that of the reflective layer. The protective composite layer in the composite that is closest to the building can be that of the reflective layer.

The reflective layers include benefits for reducing unwanted heat transfer. Where the reflective layer faces away from a building, the reflective layer reflects incoming elements back away from the building. This reflection includes reflecting all suitable incoming elements, including for example but not limited to sunlight, heat, radiation, etc. In one embodiment, the reflective layer may operate concurrent with one or more devices or elements installed on top of the composite, such as a solar panel and reflecting heat generated through the solar panel away from the building.

Where the reflective layer faces towards a building, the reflective later traps outgoing elements. For example, the reflective layer can reflect outgoing heat or radiation or other elements back towards the building, thereby maintaining heat within the building. The reflective layer facing the building can also acts a shielding agent, shielding radiation from an element installed on top of the composite, for example protecting against radiation affecting a solar panel and/or solar panel electronic elements.

The thermal reflective composite can be one or more; attached to, integral with, located beneath; the bottom side of one of; shingle, solar panel, siding. The thermally protective composite can be the backing of a roof shingle, solar panel, siding for a building. The thermally protective composite can be applied as a sheet to a building structure. It can be secured to such a structure by any known means, such as by way of example only, nails, screws, adhesive.

A roof shingle, solar panel or siding can be applied on top of the thermally protective composite. The thermally protective composite can reflect 50% or more of the thermal radiation that impacts such composite. In further embodiments, the thermally protective composite can reflect 50% or less of the thermal radiation that impacts such composite.

The protective composite for insulating a building includes various embodiments. The protective composite is composed of two or more layers. The protective composite integrates with, is attached to, or otherwise affixed to or with building material(s) or other elements. The varying layers offers different degrees of protection and functional benefits to the composite, as noted herein.

In further embodiments, the protective composite may include an exterior coating. The coating can cover the protective composite altogether. In another embodiment, the protective coating can cover one or of the individual layers. Herein, the exterior coating can be any suitable coating have protective properties, such as an anti-microbial coating that can prohibit or inhibit microbial or fungal formation. Another embodiment of an exterior coating may be a repellant coating for repelling insects of pests. An example of a repellant coating may be an insecticide or a pest repellant coating.

The protective composite provides a unique solution with beneficial results based on the integration of varying layers, each layer having its own unique property and the combination of layers generating a new overall set of proprieties for the composite itself. The combination thereof generates innovative benefits by the unique layering and the overall composite having unique properties not previously available in composite materials. The integration and variety of different layers generates unique properties based on not only the ordering of layers, but varying embodiments of multiple layers of the same material, as noted in further detail below.

FIG. 1 illustrates a cross-section of one embodiment of a roof shingle 100 in conjunction with three layers: an air retaining layer 102, a thermal reflective layer 104, and a water repelling material layer 106. The layers 102-106 are defined above.

In this embodiment, the thermally protective composite consists of the layers 102, 104, and 106. The thermally protective composite can be located beneath the shingle 100, attached to the bottom of the shingle 100, or an integrated portion of the shingle 100. The thermal reflective layer 104 reflects light and/or heat away from the building structure.

Figure 2:
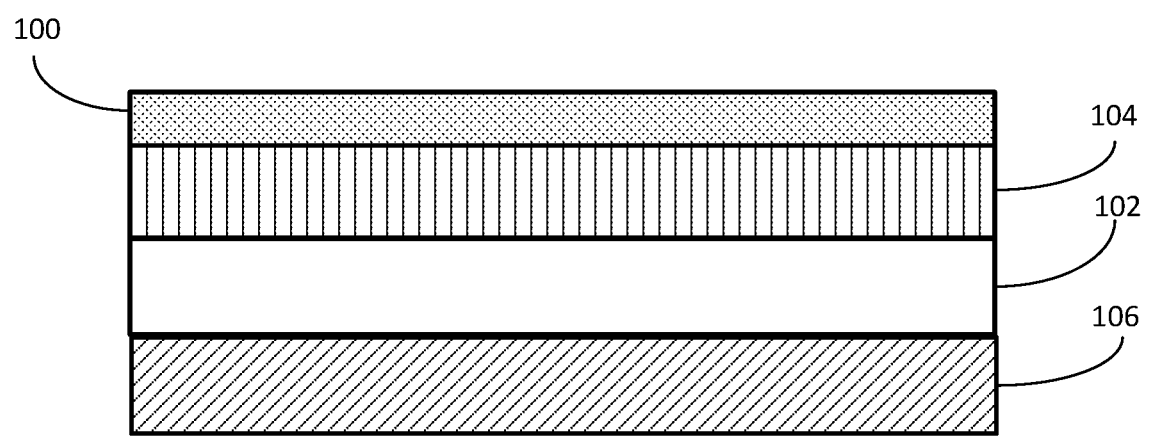
FIG. 2 is a cross-sectional side-view drawing of one embodiment of a protective composite attached to a roof shingle.

FIG. 2 illustrates a cross-section of one embodiment of the roof shingle 100 in conjunction with three layers: the thermal reflective layer 104, the air retaining layer 102, and the water repelling layer 106. The layers 102-106 are defined above.

In this embodiment, the thermally protective composite consists of the layers 104, 102, and 106. The thermally protective composite can be located beneath the shingle 100, attached to the bottom of the shingle 100, or an integrated portion of the shingle 100. The thermal reflective layer 104 reflects light and/or heat away from the building structure.

Figure 3:
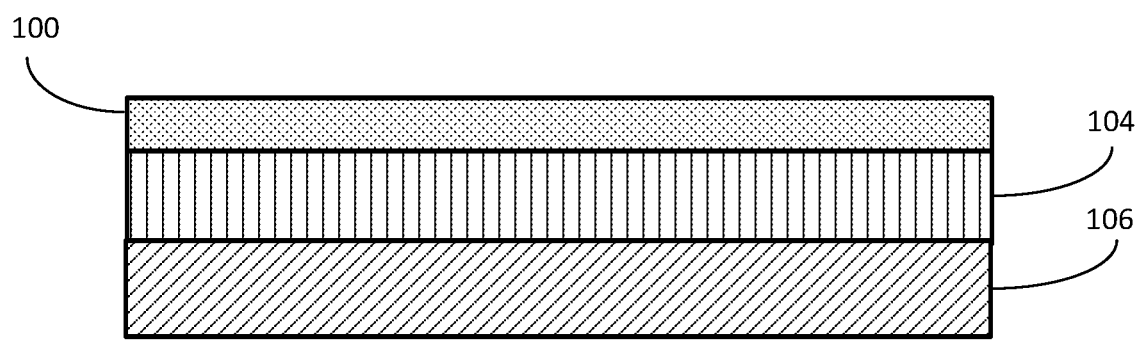
FIG. 3 is a cross-sectional side-view drawing of one embodiment of a protective composite attached to a roof shingle.

FIG. 3 illustrates a cross-section of one embodiment of the roof shingle 100 in conjunction with two layers: the thermal reflective layer 104 and the water repelling layer 106. The layers 104-106 are defined above.

In this embodiment, the thermally protective composite consists of the layers 104, 106. The thermally protective composite can be located beneath the shingle 100, attached to the bottom of the shingle 100, or an integrated portion of the shingle 100. The thermal reflective layer 104 reflects light and/or heat away from the building structure.

Figure 4:
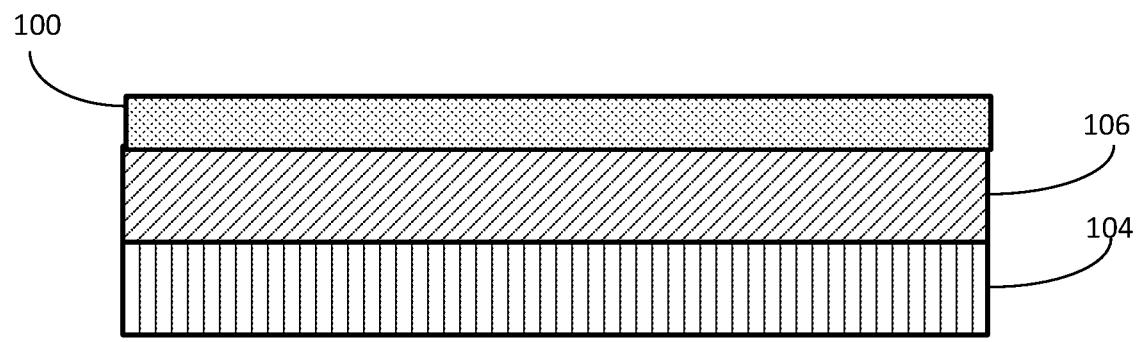
FIG. 4 is a cross-sectional side-view drawing of one embodiment of a protective composite attached to a roof shingle.

FIG. 4 illustrates a cross-section of one embodiment of the roof shingle 100 in conjunction with two layers: the water repelling layer 106 and the thermal reflective layer 104. The layers 104, 106 are defined above.

In this embodiment, the thermally protective composite consists of the layers 102-106. The thermally protective composite can be located beneath the shingle 100, attached to the bottom of the shingle 100, or an integrated portion of the shingle 100. The thermal reflective layer 104 reflects light and/or heat away from the building structure.

Figure 5:
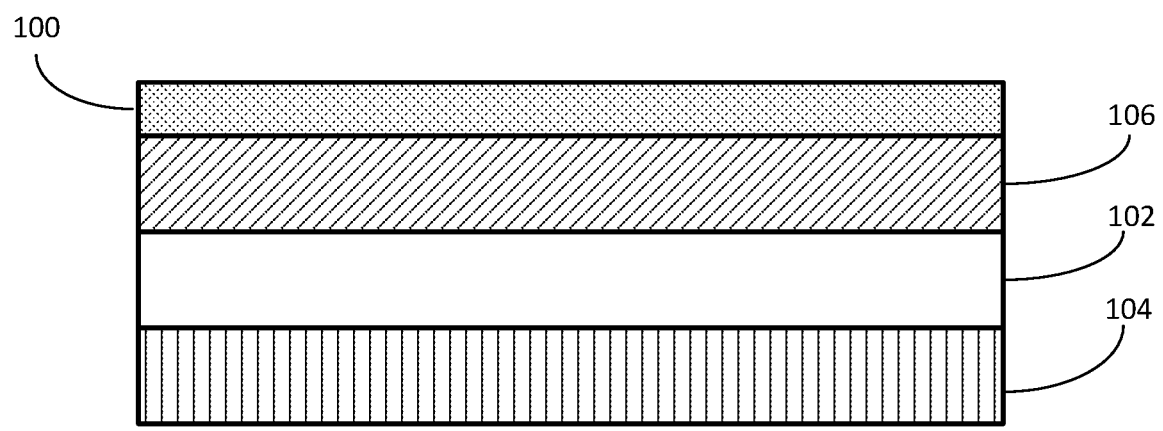
FIG. 5 is a cross-sectional side-view drawing of one embodiment of a protective composite attached to a roof shingle.

FIG. 5 illustrates a cross-section of one embodiment of the roof shingle 100 in conjunction with three layers: the water repelling layer 106, the air retaining layer 102, and the thermal reflective layer 104. The layers 102-106 are defined above.

In this embodiment, the thermally protective composite consists of the layers 106, 102, and 104. The thermally protective composite can be located beneath the shingle 100, attached to the bottom of the shingle 100, or an integrated portion of the shingle 100. The thermal reflective layer 104 reflects light and/or heat away from the building structure.

Figure 6:
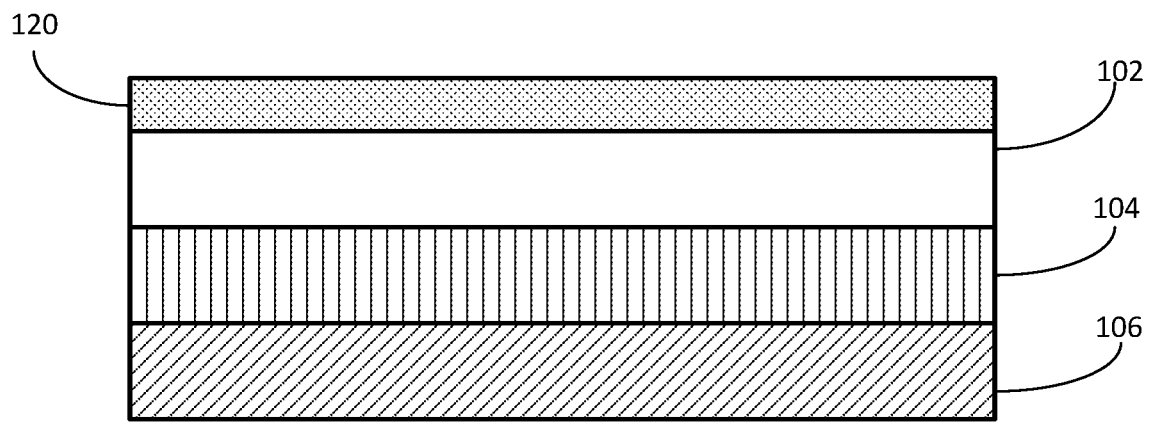
FIG. 6 is a cross-sectional side-view drawing of one embodiment of a protective composite attached to siding.

FIG. 6 illustrates a cross-section of one embodiment of a siding 120 in conjunction with three layers: an air retaining layer 102, a thermal reflective layer 104, and a water repelling material layer 106. The layers 102-106 are defined above.

In this embodiment, the thermally protective composite consists of the layers 102, 104, and 106. The thermally protective composite can be located beneath the siding 120, attached to the bottom of the siding 120, or an integrated portion of the siding 120. The thermal reflective layer 104 reflects light and/or heat away from the building structure.

Figure 7:
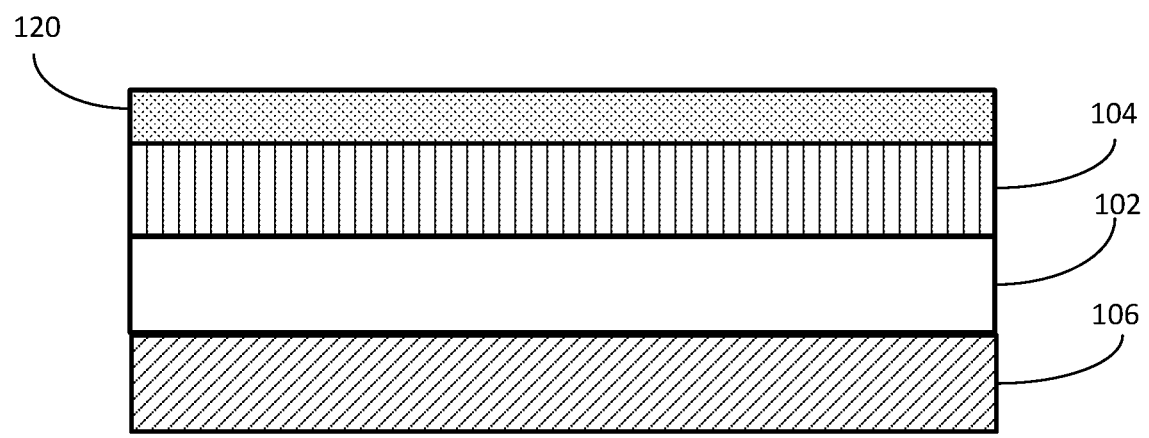
FIG. 7 is a cross-sectional side-view drawing of one embodiment of a protective composite attached to siding.

FIG. 7 illustrates a cross-section of one embodiment of the siding 120 in conjunction with three layers: the thermal reflective layer 104, the air retaining layer 102, and the water repelling layer 106. The layers 102-106 are defined above.

In this embodiment, the thermally protective composite consists of the layers 104, 102, and 106. The thermally protective composite can be located beneath the siding 120, attached to the bottom of the siding 120, or an integrated portion of the siding 120. The thermal reflective layer 104 reflects light and/or heat away from the building structure.

Figure 8:
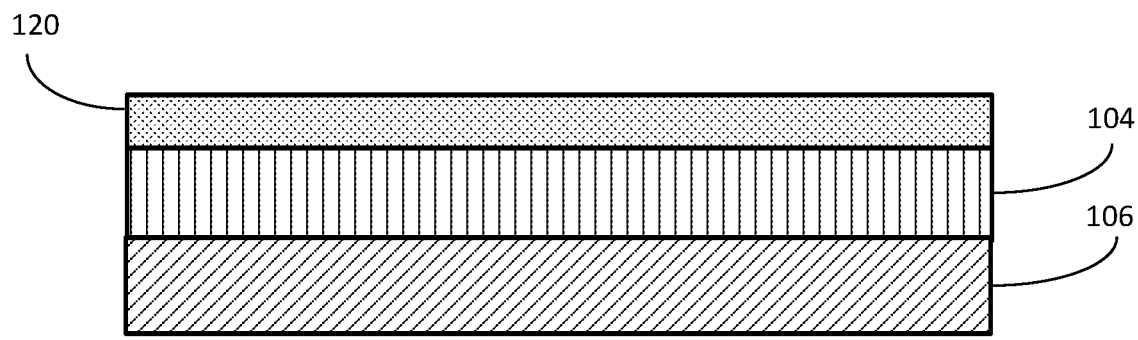
FIG. 8 is a cross-sectional side-view drawing of one embodiment of a protective composite attached to siding.

FIG. 8 illustrates a cross-section of one embodiment of the siding 120 in conjunction with two layers: the thermal reflective layer 104 and the water repelling layer 106. The layers 104-106 are defined above.

In this embodiment, the thermally protective composite consists of the layers 104, 106. The thermally protective composite can be located beneath the siding 120, attached to the bottom of the siding 120, or an integrated portion of the siding 120. The thermal reflective layer 104 reflects light and/or heat away from the building structure.

Figure 9:
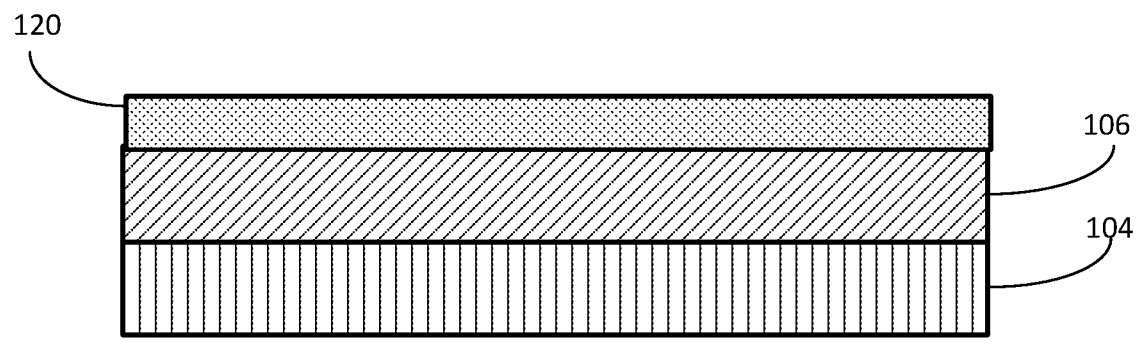
FIG. 9 is a cross-sectional side-view drawing of one embodiment of a protective composite attached to siding.

FIG. 9 illustrates a cross-section of one embodiment of the siding 120 in conjunction with two layers: the water repelling layer 106 and the thermal reflective layer 104. The layers 104, 106 are defined above.

In this embodiment, the thermally protective composite consists of the layers 102-106. The thermally protective composite can be located beneath the siding 120, attached to the bottom of the siding 120, or an integrated portion of the siding 120. The thermal reflective layer 104 reflects light and/or heat away from the building structure.

Figure 10:
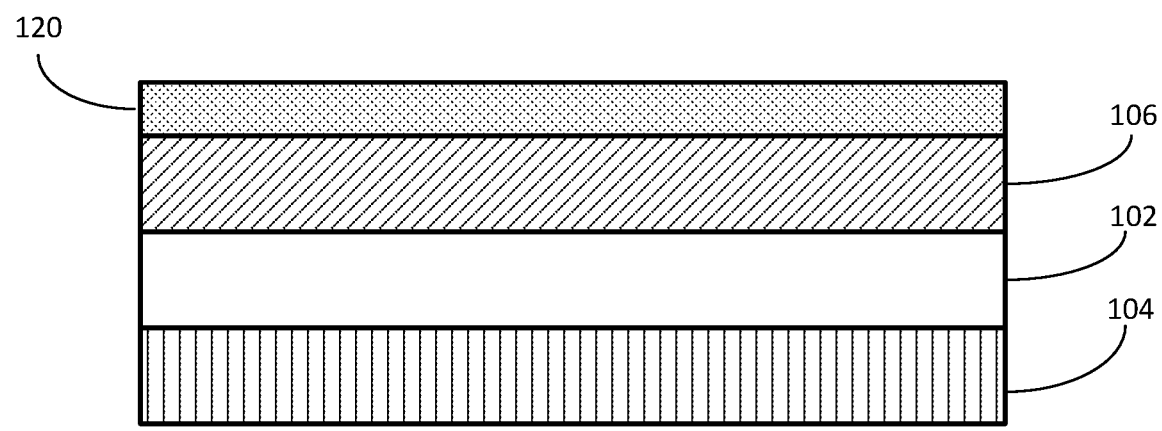
FIG. 10 is a cross-sectional side-view drawing of one embodiment of a protective composite attached to siding.

FIG. 10 illustrates a cross-section of one embodiment of the siding 120 in conjunction with three layers: the water repelling layer 106, the air retaining layer 102, and the thermal reflective layer 104. The layers 102-106 are defined above.

In this embodiment, the thermally protective composite consists of the layers 106, 102, and 104. The thermally protective composite can be located beneath the siding 120, attached to the bottom of the siding 120, or an integrated portion of the siding 120. The thermal reflective layer 104 reflects light and/or heat away from the building structure.

Figure 11:
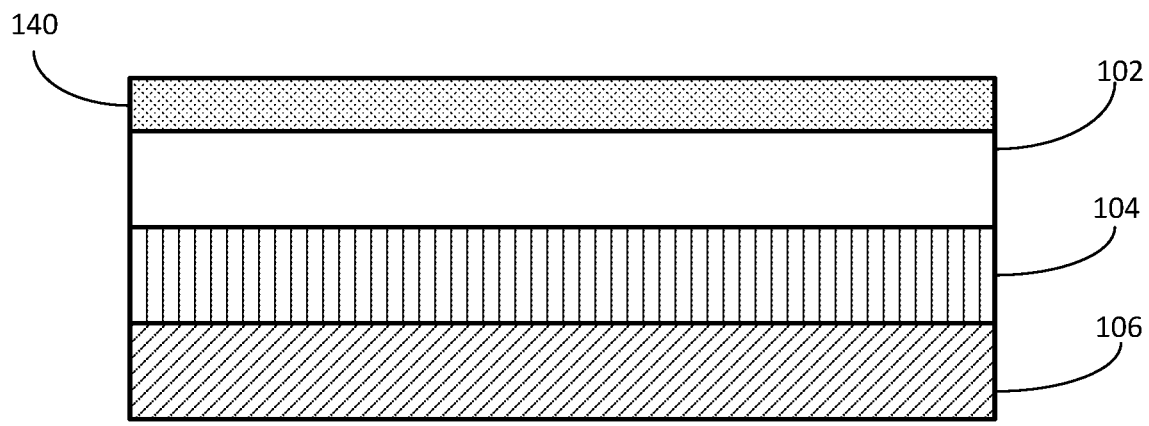
FIG. 11 is a cross-sectional side-view drawing of one embodiment of a protective composite attached to a solar panel.

FIG. 11 illustrates a cross-section of one embodiment of a solar panel 140 in conjunction with three layers: an air retaining layer 102, a thermal reflective layer 104, and a water repelling material layer 106. The layers 102-106 are defined above.

In this embodiment, the thermally protective composite consists of the layers 102, 104, and 106. The thermally protective composite can be located beneath the solar panel 140, attached to the bottom of the solar panel 140, or an integrated portion of the solar panel 140. The thermal reflective layer 104 reflects light and/or heat away from the building structure.

Figure 12:
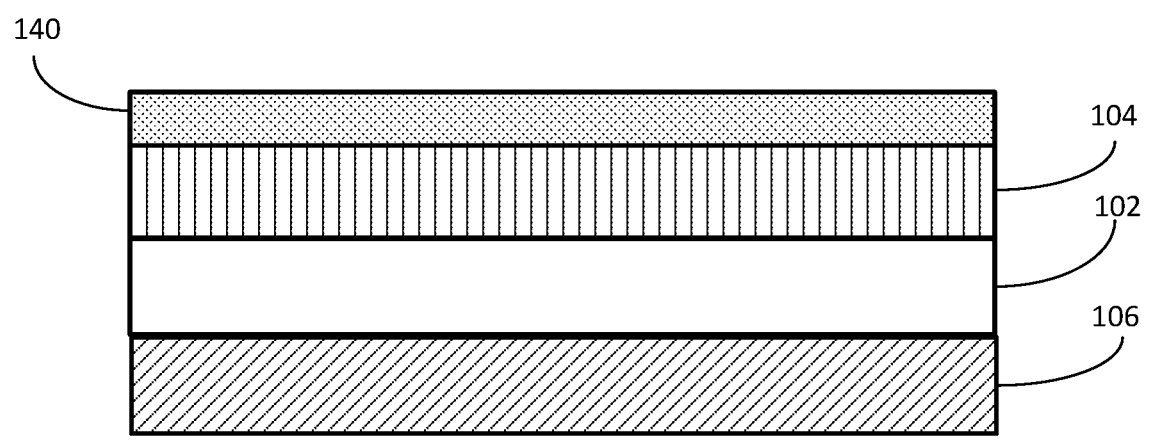
FIG. 12 is a cross-sectional side-view drawing of one embodiment of a protective composite attached to a solar panel.

FIG. 12 illustrates a cross-section of one embodiment of the solar panel 140 in conjunction with three layers: the thermal reflective layer 104, the air retaining layer 102, and the water repelling layer 106. The layers 102-106 are defined above.

In this embodiment, the thermally protective composite consists of the layers 104, 102, and 106. The thermally protective composite can be located beneath the solar panel 140, attached to the bottom of the solar panel 140, or an integrated portion of the solar panel 140. The thermal reflective layer 104 reflects light and/or heat away from the building structure.

Figure 13:
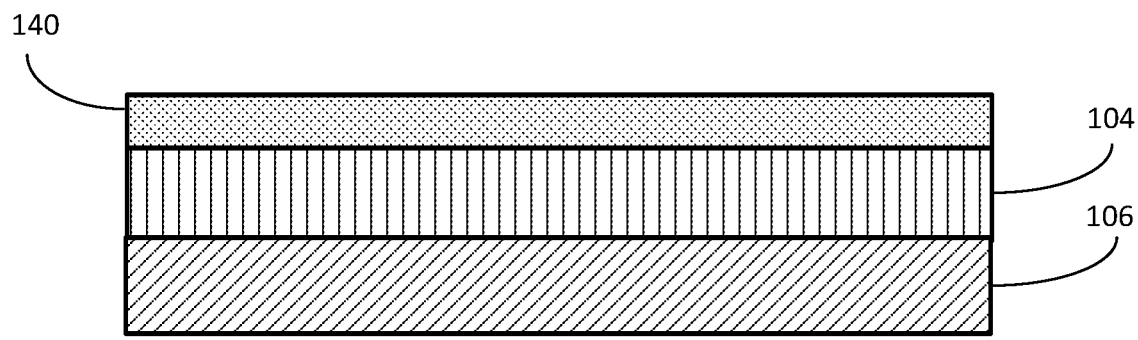
FIG. 13 is a cross-sectional side-view drawing of one embodiment of a protective composite attached to a solar panel.

FIG. 13 illustrates a cross-section of one embodiment of the solar panel 140 in conjunction with two layers: the thermal reflective layer 104 and the water repelling layer 106. The layers 104-106 are defined above.

In this embodiment, the thermally protective composite consists of the layers 104, 106. The thermally protective composite can be located beneath the solar panel 140, attached to the bottom of the solar panel 140, or an integrated portion of the solar panel 140. The thermal reflective layer 104 reflects light and/or heat away from the building structure.

Figure 14:
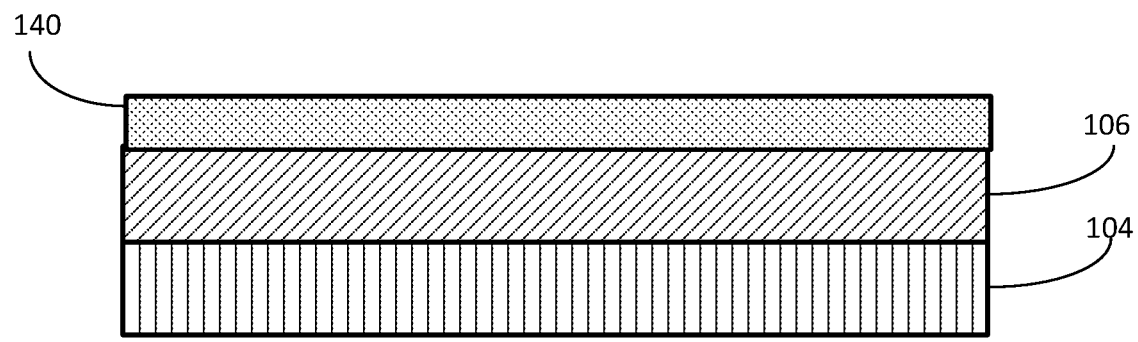
FIG. 14 is a cross-sectional side-view drawing of one embodiment of a protective composite attached to a solar panel.

FIG. 14 illustrates a cross-section of one embodiment of the solar panel 140 in conjunction with two layers: the water repelling layer 106 and the thermal reflective layer 104. The layers 104, 106 are defined above.

In this embodiment, the thermally protective composite consists of the layers 102-106. The thermally protective composite can be located beneath the solar panel 140, attached to the bottom of the solar panel 140, or an integrated portion of the solar panel 140. The thermal reflective layer 104 reflects light and/or heat away from the building structure.

Figure 15:
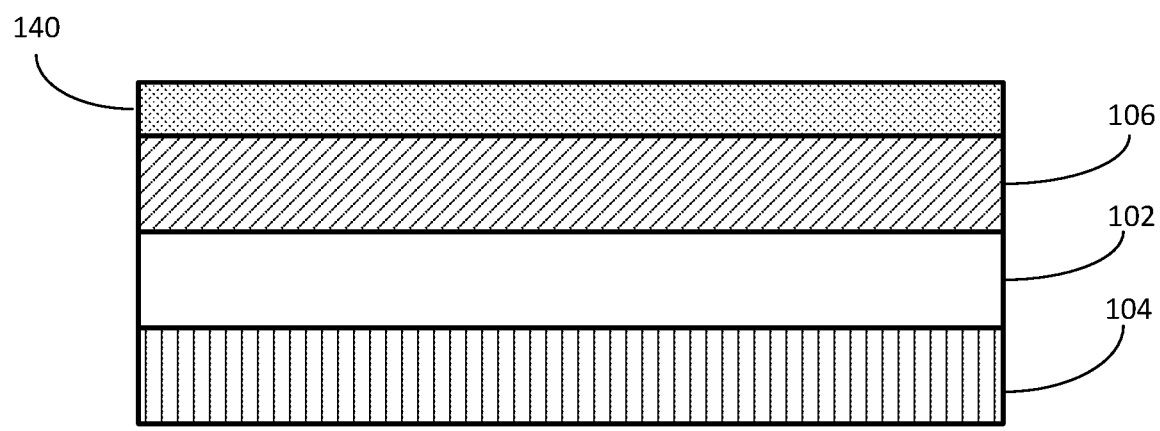
FIG. 15 is a cross-sectional side-view drawing of one embodiment of a protective composite attached to a solar panel.

FIG. 15 illustrates a cross-section of one embodiment of the solar panel 140 in conjunction with three layers: the water repelling layer 106, the air retaining layer 102, and the thermal reflective layer 104. The layers 102-106 are defined above.

In this embodiment, the thermally protective composite consists of the layers 106, 102, and 104. The thermally protective composite can be located beneath the solar panel 140, attached to the bottom of the solar panel 140, or an integrated portion of the solar panel 140. The thermal reflective layer 104 reflects light and/or heat away from the building structure.

In further embodiments, the protective composite may include additional repeating layers. Moreover, the embodiments noted herein are not expressly limiting and additional layers, coatings, adhesives, or other materials may be integrated therewith.

Figure 16:
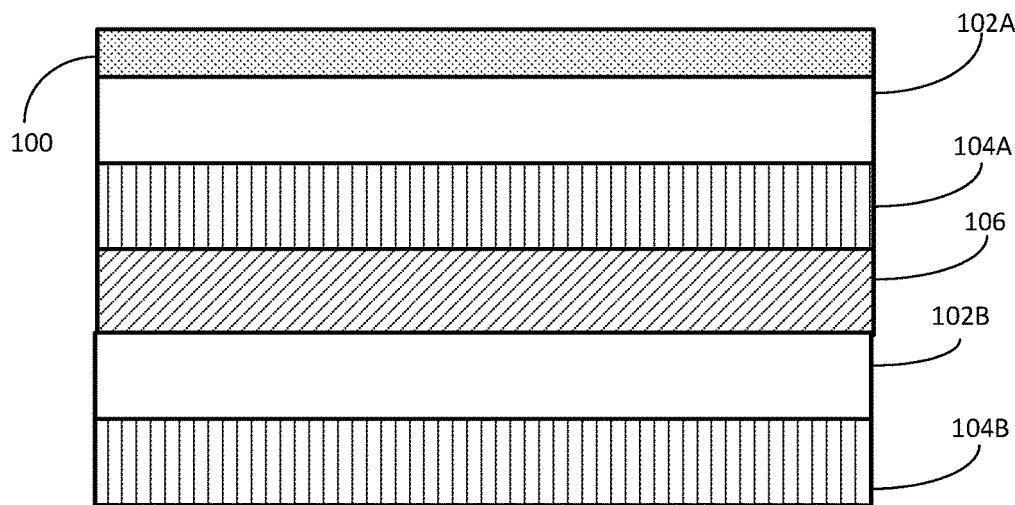
FIG. 16 is a cross-sectional side-view drawing of one embodiment of a protective composite attached to a roof shingle.

FIG. 16 illustrates a cross-section of one embodiment of the roof shingle 100 in conjunction with fiver layers: a first air retaining layer 102A, a first thermal reflective layer 104A, a water repelling material layer 106, a second air retaining layer 102B, and a second thermal reflective layer 104B. The layers 102-106 are defined above.

In this embodiment, the thermally protective composite consists of the layers 102A, 104A, 106, 102B, and 104B. The thermally protective composite can be located beneath the shingle 100, attached to the bottom of the shingle 100, or an integrated portion of the shingle 100. The thermal reflective layer 104A reflects light and/or heat away from the building structure. The thermal reflective layer 104B reflects light and/or heat towards the building structure.

Figure 17:
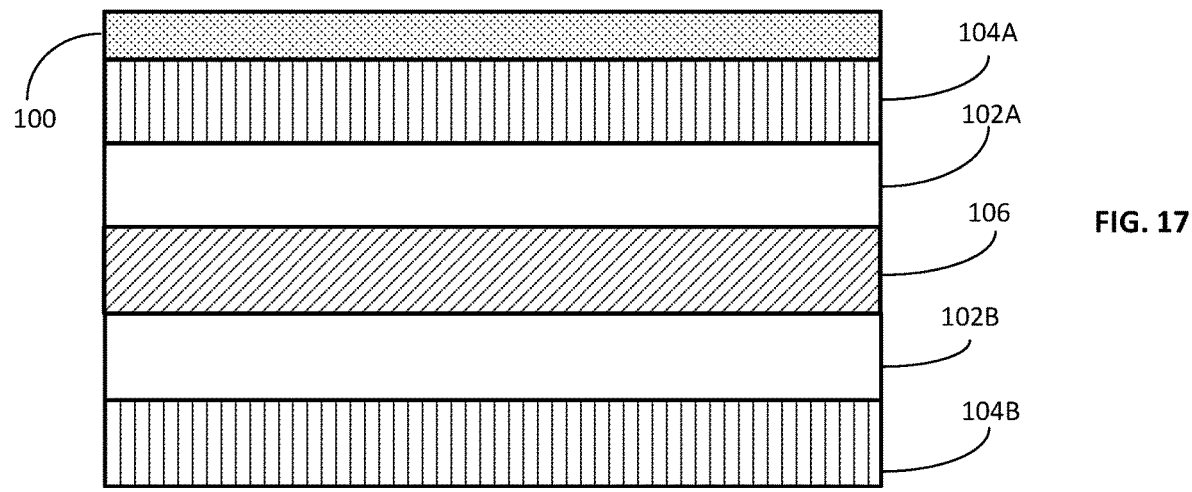
FIG. 17 is a cross-sectional side-view drawing of one embodiment of a protective composite attached to a roof shingle.

FIG. 17 illustrates a cross-section of one embodiment of the roof shingle 100 in conjunction with five layers: the first thermal reflective layer 104A, the first air retaining layer 102A, the water repelling layer 106, the second air retaining layer 102B, and the second thermal reflective layer 104B. The layers 102-106 are defined above.

In this embodiment, the thermally protective composite consists of the layers 104A, 102A, 106, 102B, and 104B. The thermally protective composite can be located beneath the shingle 100, attached to the bottom of the shingle 100, or an integrated portion of the shingle 100. The thermal reflective layer 104A reflects light and/or heat away from the building structure. The thermal reflective layer 104B reflects light and/or heat towards the building structure.

Figure 18:
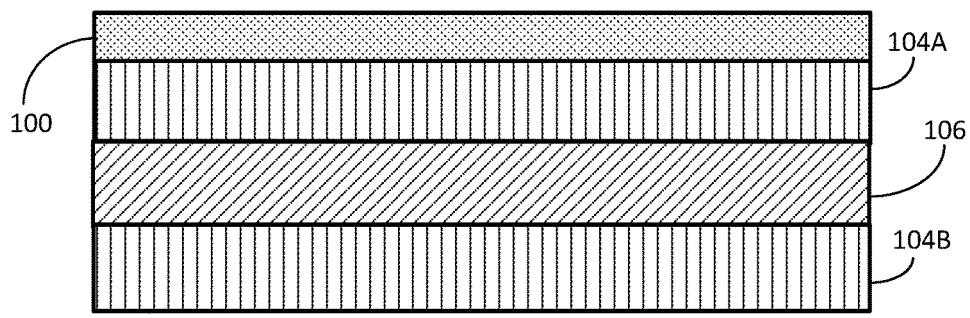
FIG. 18 is a cross-sectional side-view drawing of one embodiment of a protective composite attached to a roof shingle.

FIG. 18 illustrates a cross-section of one embodiment of the roof shingle 100 in conjunction with three layers: the first thermal reflective layer 104A, the water repelling layer 106, and the second thermal reflective layer 104B. The layers 104-106 are defined above.

In this embodiment, the thermally protective composite consists of the layers 104A, 106, and 104B. The thermally protective composite can be located beneath the shingle 100, attached to the bottom of the shingle 100, or an integrated portion of the shingle 100. The thermal reflective layer 104A reflects light and/or heat away from the building structure. The thermal reflective layer 104B reflects light and/or heat towards the building structure.

Figure 19:
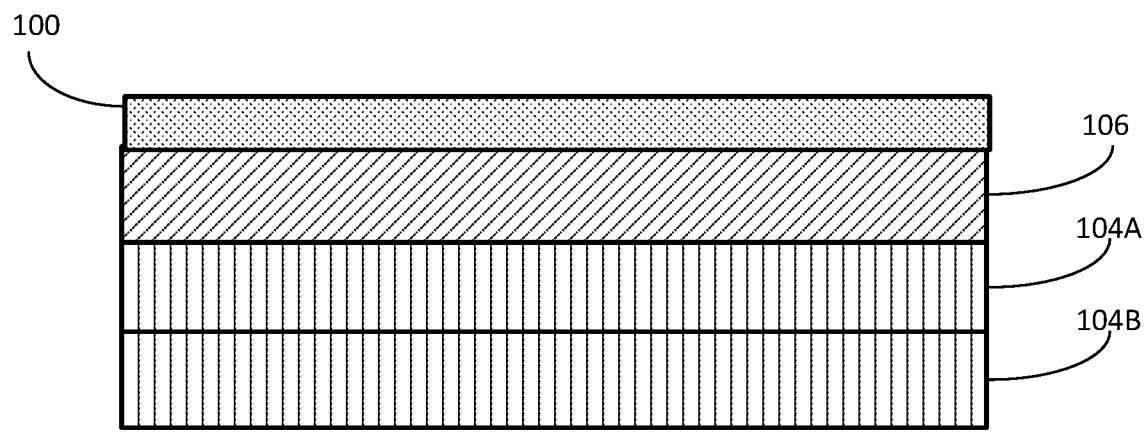
FIG. 19 is a cross-sectional side-view drawing of one embodiment of a protective composite attached to a roof shingle.

FIG. 19 illustrates a cross-section of one embodiment of the roof shingle 100 in conjunction with three layers: the water repelling layer 106, the first thermal reflective layer 104A, and the second thermal reflective layer 104B. The layers 104, 106 are defined above.

In this embodiment, the thermally protective composite consists of the layers 106, 104A, 104B. The thermally protective composite can be located beneath the shingle 100, attached to the bottom of the shingle 100, or an integrated portion of the shingle 100. The thermal reflective layer 104A reflects light and/or heat away from the building structure. The thermal reflective layer 104B reflects light and/or heat towards the building structure.

Figure 20:
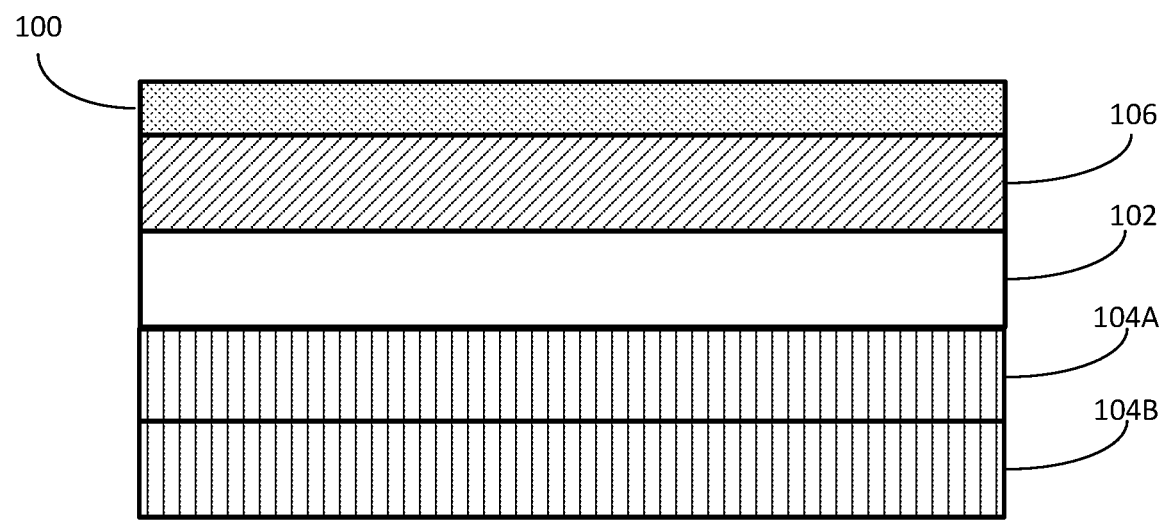
FIG. 20 is a cross-sectional side-view drawing of one embodiment of a protective composite attached to a roof shingle.

FIG. 20 illustrates a cross-section of one embodiment of the roof shingle 100 in conjunction with four layers: the water repelling layer 106, the air retaining layer 102, the first thermal reflective layer 104A, and the second thermal reflective layer 104B. The layers 102-106 are defined above.

In this embodiment, the thermally protective composite consists of the layers 106, 102, 104A and 104B. The thermally protective composite can be located beneath the shingle 100, attached to the bottom of the shingle 100, or an integrated portion of the shingle 100. The thermal reflective layer 104A reflects light and/or heat away from the building structure. The thermal reflective layer 104B reflects light and/or heat towards the building structure.

Figure 21:
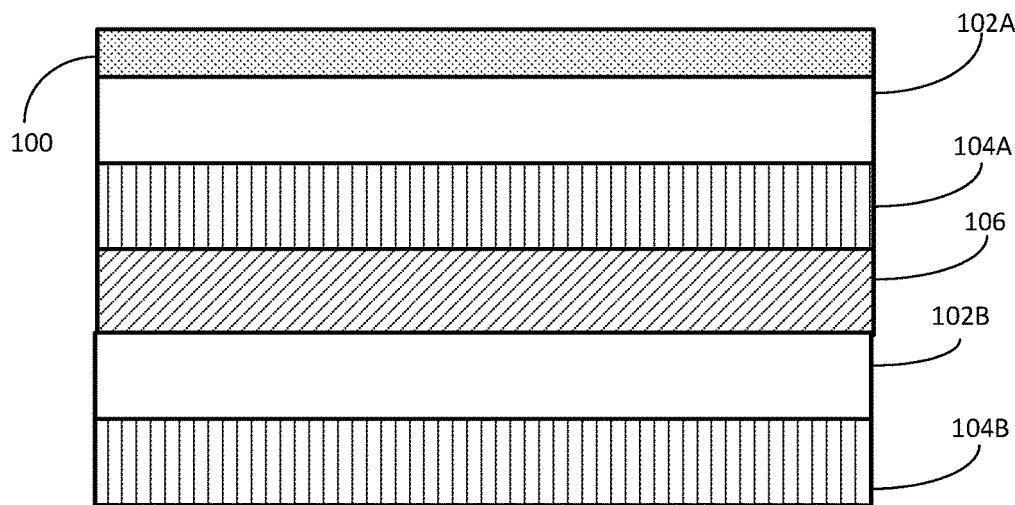
FIG. 21 is a cross-sectional side-view drawing of one embodiment of a protective composite attached to siding.

FIG. 21 illustrates a cross-section of one embodiment of the siding 120 in conjunction with fiver layers: a first air retaining layer 102A, a first thermal reflective layer 104A, a water repelling material layer 106, a second air retaining layer 102B, and a second thermal reflective layer 104B. The layers 102-106 are defined above.

In this embodiment, the thermally protective composite consists of the layers 102A, 104A, 106, 102B, and 104B. The thermally protective composite can be located beneath the siding 120, attached to the bottom of the siding 120, or an integrated portion of the siding 120. The thermal reflective layer 104A reflects light and/or heat away from the building structure. The thermal reflective layer 104B reflects light and/or heat towards the building structure.

Figure 22:
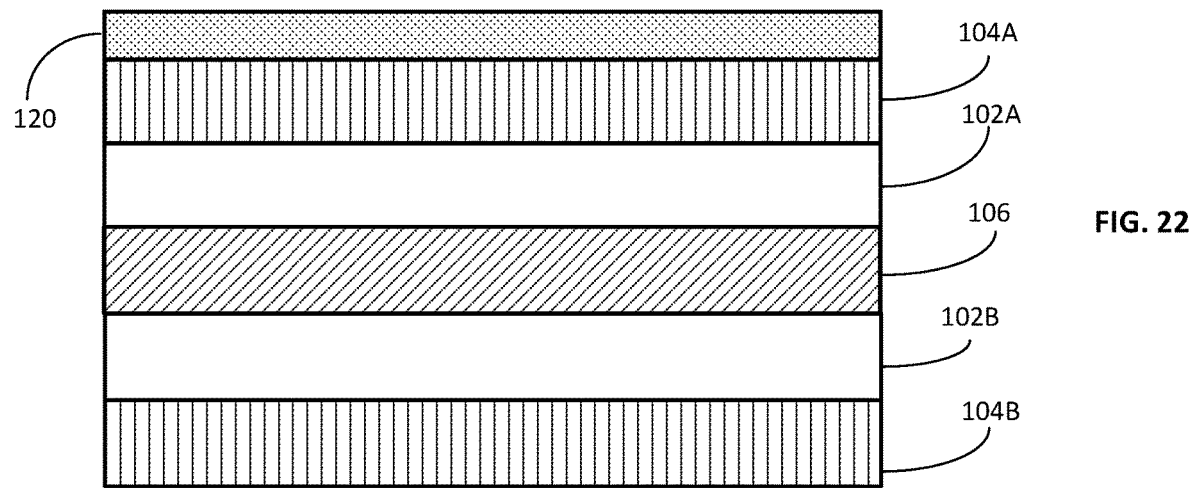
FIG. 22 is a cross-sectional side-view drawing of one embodiment of a protective composite attached to siding.

FIG. 22 illustrates a cross-section of one embodiment of the siding 120 in conjunction with five layers: the first thermal reflective layer 104A, the first air retaining layer 102A, the water repelling layer 106, the second air retaining layer 102B, and the second thermal reflective layer 104B. The layers 102-106 are defined above.

In this embodiment, the thermally protective composite consists of the layers 104A, 102A, 106, 102B, and 104B. The thermally protective composite can be located beneath the siding 120, attached to the bottom of the siding 120, or an integrated portion of the siding 120. The thermal reflective layer 104A reflects light and/or heat away from the building structure. The thermal reflective layer 104B reflects light and/or heat towards the building structure.

Figure 23:
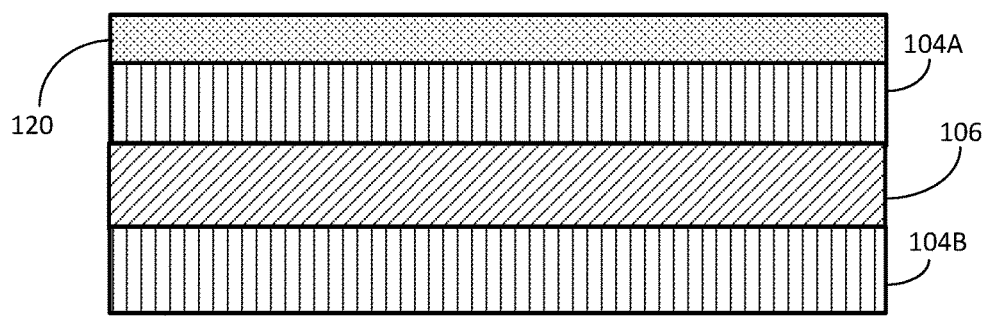
FIG. 23 is a cross-sectional side-view drawing of one embodiment of a protective composite attached to siding.

FIG. 23 illustrates a cross-section of one embodiment of the siding 120 in conjunction with three layers: the first thermal reflective layer 104A, the water repelling layer 106, and the second thermal reflective layer 104B. The layers 104-106 are defined above.

In this embodiment, the thermally protective composite consists of the layers 104A, 106, and 104B. The thermally protective composite can be located beneath the siding 120, attached to the bottom of the siding 120, or an integrated portion of the siding 120. The thermal reflective layer 104A reflects light and/or heat away from the building structure. The thermal reflective layer 104B reflects light and/or heat towards the building structure.

Figure 24:
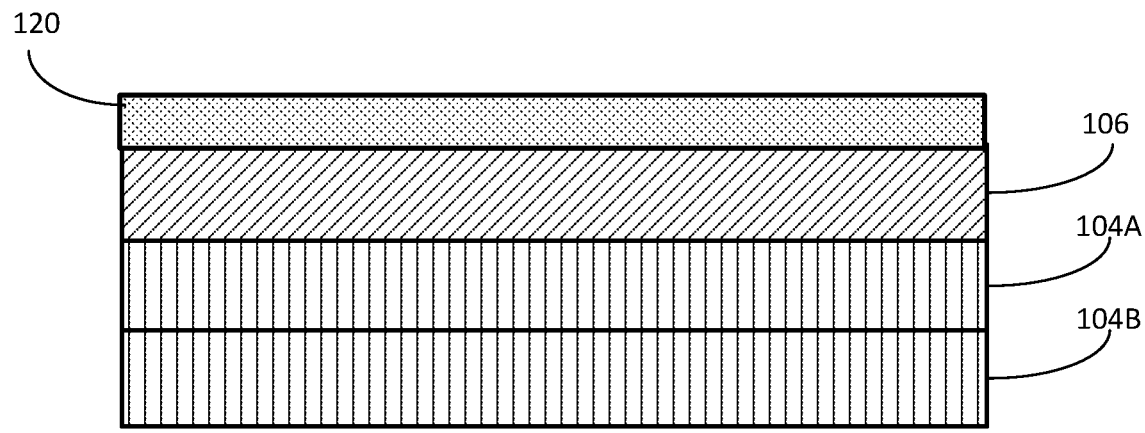
FIG. 24 is a cross-sectional side-view drawing of one embodiment of a protective composite attached to siding.

FIG. 24 illustrates a cross-section of one embodiment of the siding 120 in conjunction with three layers: the water repelling layer 106, the first thermal reflective layer 104A, and the second thermal reflective layer 104B. The layers 104, 106 are defined above.

In this embodiment, the thermally protective composite consists of the layers 106, 104A, 104B. The thermally protective composite can be located beneath the siding 120, attached to the bottom of the siding 120, or an integrated portion of the siding 120. The thermal reflective layer 104A reflects light and/or heat away from the building structure. The thermal reflective layer 104B reflects light and/or heat towards the building structure.

Figure 25:
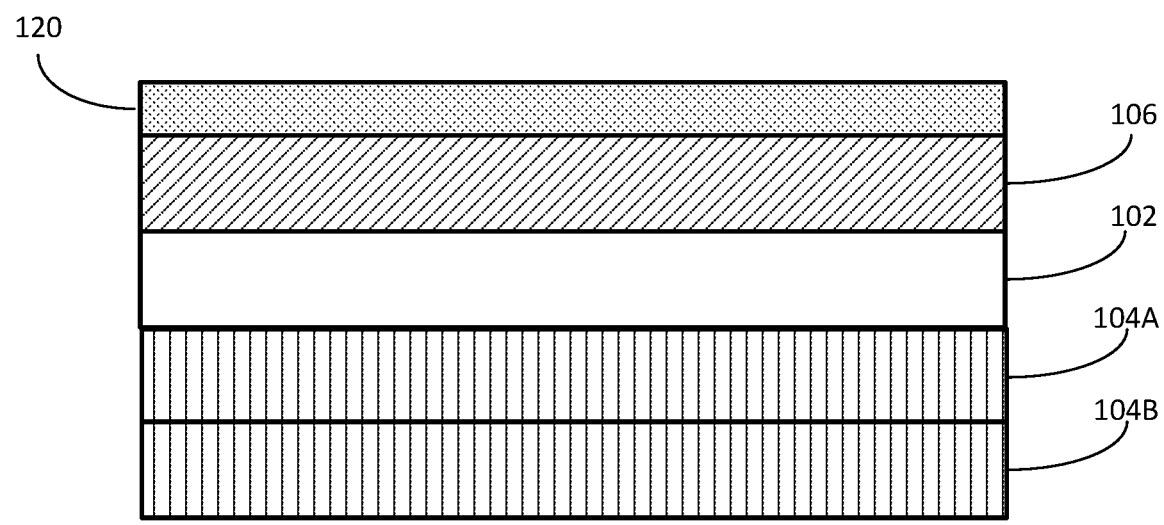
FIG. 25 is a cross-sectional side-view drawing of one embodiment of a protective composite attached to siding.

FIG. 25 illustrates a cross-section of one embodiment of the siding 120 in conjunction with four layers: the water repelling layer 106, the air retaining layer 102, the first thermal reflective layer 104A, and the second thermal reflective layer 104B. The layers 102-106 are defined above.

In this embodiment, the thermally protective composite consists of the layers 106, 102, 104A and 104B. The thermally protective composite can be located beneath the siding 120, attached to the bottom of the siding 120, or an integrated portion of the siding 120. The thermal reflective layer 104A reflects light and/or heat away from the building structure. The thermal reflective layer 104B reflects light and/or heat towards the building structure.

Figure 26:
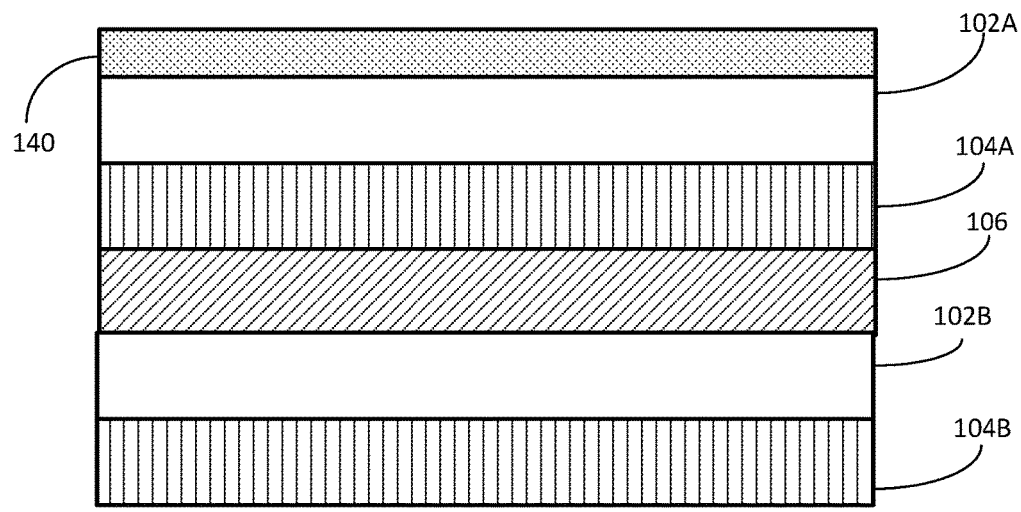
FIG. 26 is a cross-sectional side-view drawing of one embodiment of a protective composite attached to a solar panel.

FIG. 26 illustrates a cross-section of one embodiment of the solar panel 140 in conjunction with fiver layers: a first air retaining layer 102A, a first thermal reflective layer 104A, a water repelling material layer 106, a second air retaining layer 102B, and a second thermal reflective layer 104B. The layers 102-106 are defined above.

In this embodiment, the thermally protective composite consists of the layers 102A, 104A, 106, 102B, and 104B. The thermally protective composite can be located beneath the solar panel 140, attached to the bottom of the solar panel 140, or an integrated portion of the solar panel 140. The thermal reflective layer 104A reflects light and/or heat away from the building structure. The thermal reflective layer 104B reflects light and/or heat towards the building structure.

Figure 27:
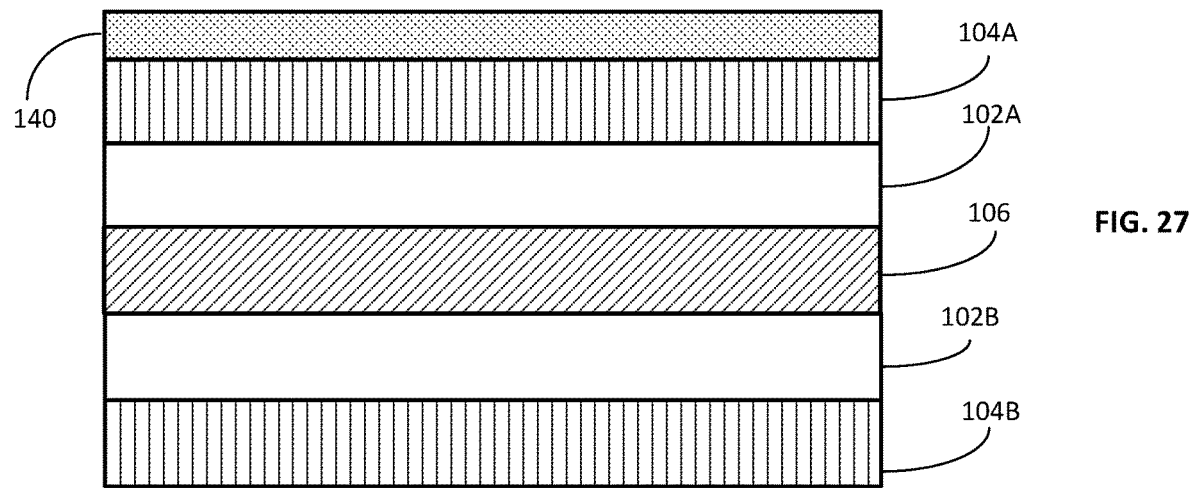
FIG. 27 is a cross-sectional side-view drawing of one embodiment of a protective composite attached to a solar panel.

FIG. 27 illustrates a cross-section of one embodiment of the solar panel 140 in conjunction with five layers: the first thermal reflective layer 104A, the first air retaining layer 102A, the water repelling layer 106, the second air retaining layer 102B, and the second thermal reflective layer 104B. The layers 102-106 are defined above.

In this embodiment, the thermally protective composite consists of the layers 104A, 102A, 106, 102B, and 104B. The thermally protective composite can be located beneath the solar panel 140, attached to the bottom of the solar panel 140, or an integrated portion of the solar panel 140. The thermal reflective layer 104A reflects light and/or heat away from the building structure. The thermal reflective layer 104B reflects light and/or heat towards the building structure.

Figure 28:
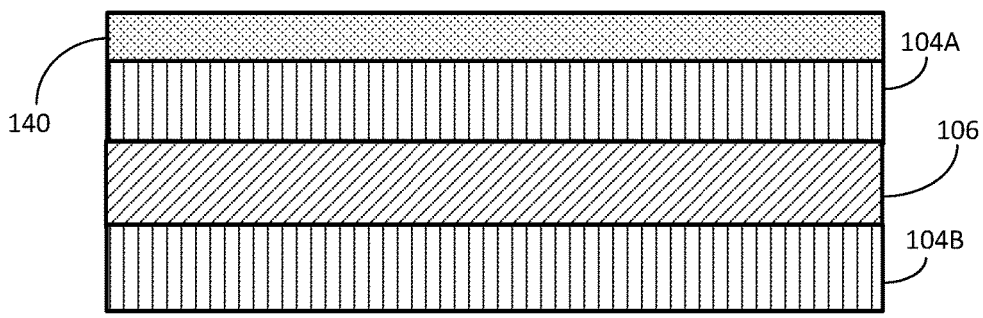
FIG. 28 is a cross-sectional side-view drawing of one embodiment of a protective composite attached to a solar panel.

FIG. 28 illustrates a cross-section of one embodiment of the solar panel 140 in conjunction with three layers: the first thermal reflective layer 104A, the water repelling layer 106, and the second thermal reflective layer 104B. The layers 104-106 are defined above.

In this embodiment, the thermally protective composite consists of the layers 104A, 106, and 104B. The thermally protective composite can be located beneath the solar panel 140, attached to the bottom of the solar panel 140, or an integrated portion of the solar panel 140. The thermal reflective layer 104A reflects light and/or heat away from the building structure. The thermal reflective layer 104B reflects light and/or heat towards the building structure.

Figure 29:
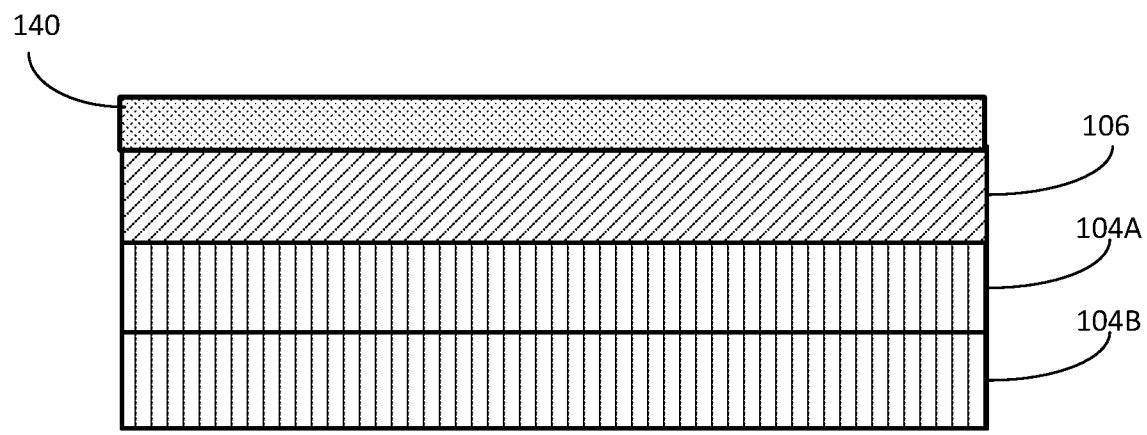
FIG. 29 is a cross-sectional side-view drawing of one embodiment of a protective composite attached to a solar panel.

FIG. 29 illustrates a cross-section of one embodiment of the solar panel 140 in conjunction with three layers: the water repelling layer 106, the first thermal reflective layer 104A, and the second thermal reflective layer 104B. The layers 104, 106 are defined above.

In this embodiment, the thermally protective composite consists of the layers 106, 104A, 104B. The thermally protective composite can be located beneath the solar panel 140, attached to the bottom of the solar panel 140, or an integrated portion of the solar panel 140. The thermal reflective layer 104A reflects light and/or heat away from the building structure. The thermal reflective layer 104B reflects light and/or heat towards the building structure.

Figure 30:
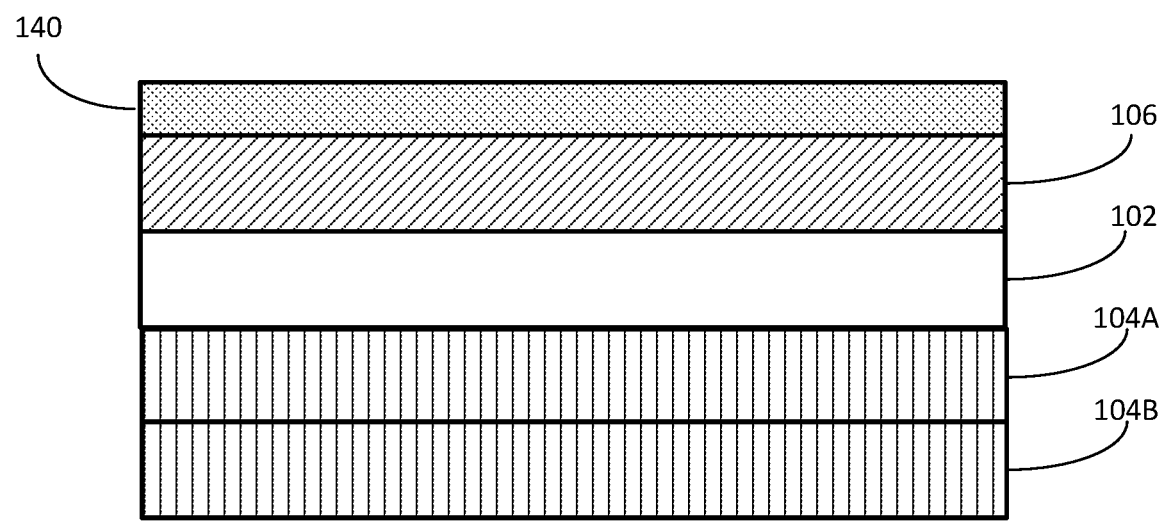
FIG. 30 is a cross-sectional side-view drawing of one embodiment of a protective composite attached to a solar panel.

FIG. 30 illustrates a cross-section of one embodiment of the solar panel 140 in conjunction with four layers: the water repelling layer 106, the air retaining layer 102, the first thermal reflective layer 104A, and the second thermal reflective layer 104B. The layers 102-106 are defined above.

In this embodiment, the thermally protective composite consists of the layers 106, 102, 104A and 104B. The thermally protective composite can be located beneath the solar panel 140, attached to the bottom of the solar panel 140, or an integrated portion of the solar panel 140. The thermal reflective layer 104A reflects light and/or heat away from the building structure. The thermal reflective layer 104B reflects light and/or heat towards the building structure.

The invention disclosed and claimed herein is that of a novel composite made up of two or more different materials. These different materials can be attached layers, laminated layers, a composite material mix, or other materials as recognized by one skilled in the art. The novel composite, by its make-up, provides a novel thermal protective layer that actively reduces thermal energy being transferred between a building and an outdoor environment. In another embodiment, the novel composite, by its make-up, provides a novel thermal protective layer that reduces thermal energy loss from an indoor environment of the building to which it is applied.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. A protective composite for insulating a building, the protective composite comprising:
    a thermal reflective layer having a reflective surface;
    an air retaining material layer including a material retaining air therein;
    a water repelling material layer; and
    a repellent coating consisting of at least one of: an insecticide and a pest repellent.

2. The protective composite of claim 1, wherein at least two of the thermal reflective layer, the air retaining material layer, and the water repelling layer are attached to one another.

3. The protective composite of claim 1, wherein the air retaining material layer and the water repelling material layer are thermally bonded to one another.

4. The protective composite of claim 1, wherein at least two of the thermal reflective layer, the air retaining material layer, and the water repelling layer are laminated to one another.

5. The protective composite of claim 1, wherein the protective composite is a stack of the thermal reflective layer, the air retaining material layer, and the water repelling layer.

6. The protective composite of claim 1, wherein the water repelling material layer comprises tar paper.

7. The protective composite of claim 1, wherein the water repelling material layer comprises asphalt.

8. The protective composite of claim 1, wherein the air retaining material layer comprises at least one of: open cell foam and closed cell foam.

9. The protective composite of claim 1, wherein the air retaining material layer is composed of an absorptive material.

10. The protective composite of claim 1, wherein the thermal reflective layer is comprised of a polyethylene terephthalate film.

11. The protective composite of claim 1, wherein the air retaining material comprises at least one of: ethylene-vinyl acetate and expanded polyethylene.

12. The protective composite of claim 1, wherein the reflective surface of the thermal reflective layer faces away from the building.

13. The protective composite of claim 1, wherein the reflective surface of the thermal reflective layer faces towards the building.

14. The protective composite of claim 1, wherein the reflective surface is a first reflective surface, the protective composite further comprising a second reflective surface, wherein the first reflective surface faces in a direction opposite of the second reflective surface.

15. The protective composite of claim 1, wherein the reflective surface reflects at least one of: infra-red radiation, thermal radiation, electro-magnetic radiation.

16. The protective composite of claim 1, wherein the reflective surface of the thermal reflective layer reflects 50% or more of a thermal radiation impacting the thermal reflect layer.

17. The protective composite of claim 1, wherein the reflective surface of the thermal reflective layer is silver.

18. The protective composite of claim 1, wherein the reflective surface of the thermal reflective layer is a metalized layer.

19. The protective composite of claim 1, wherein the reflective surface of the thermal reflective layer is a polyethylene terephthalate film.

20. The protective composite of claim 1, wherein the protective composite is at least one of: rollable and foldable.

21. The protective composite of claim 1, wherein the protective composite is formed in a sheet of layers.

22. The protective composite of claim 1, wherein the water repelling material layer is in a layer of the protective composite at least one of: closest to an outdoor environment and closest to the building.

23. The protective composite of claim 1 further comprising an anti-microbial coating, wherein the anti-microbial coating covers at least one of: the protective composite, the thermal reflective layer, the air retaining material layer, and the water repelling material layer.

24. The protective composite of claim 1 further comprising, wherein the repellent coating covers at least one of: the protective composite, the thermal reflective layer, the air retaining material layer, and the water repelling material layer.

* * * * *